Oct. 14, 1969  A. MILGRAM ET AL  3,472,313
CENTRAL HEATING AND COOLING SYSTEM
Filed May 1, 1967  2 Sheets-Sheet 1

Arthur Milgram
Sidney Siegel
INVENTORS.

BY

Karl G. Ross
Attorney

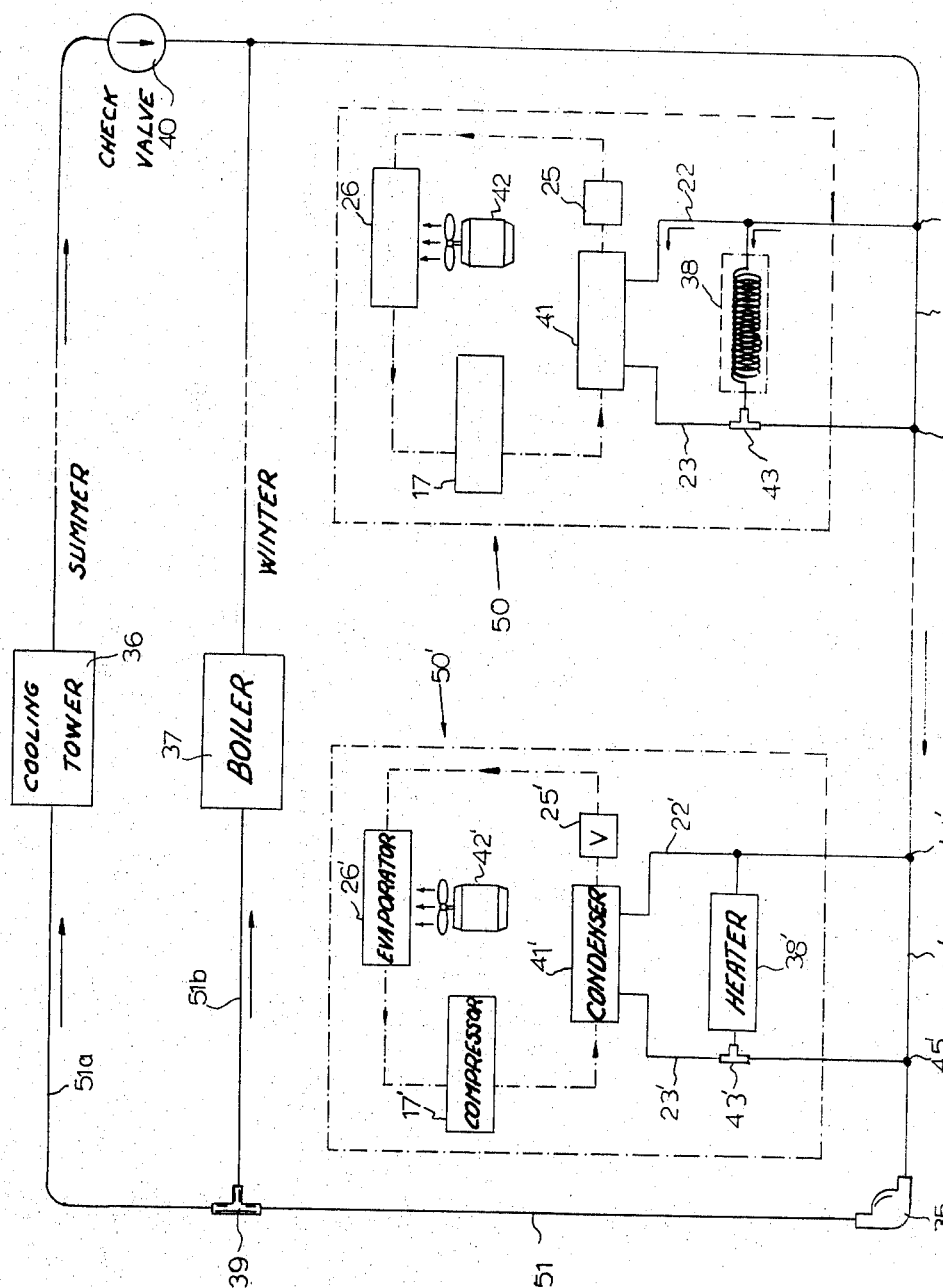

3,472,313
CENTRAL HEATING AND COOLING SYSTEM
Arthur Milgram, 26 Scholz St., Westbury, N.Y. 11590, and Sidney Siegel, 989 Schenectady Ave., Brooklyn, N.Y. 11203
Filed May 1, 1967, Ser. No. 635,233
Int. Cl. F24f *3/00, 3/06*
U.S. Cl. 165—22            6 Claims

ABSTRACT OF THE DISCLOSURE

System for heating and cooling several rooms in a building equipped with a central heating and cooling plant through which water is circulated by means of a common pipe through all the rooms whose temperature is to be controlled, a section of that pipe in each such room being provided with a bypass for diverting a minor fraction of the circulating water into either a heating unit or an air-conditioning unit branched across that section whereby the greater part of the flow continues substantially at its original temperature until its recombination with the diverted stream so that the overall flow undergoes only a small change in temperature when passing from one room to the next.

---

Figure 1:
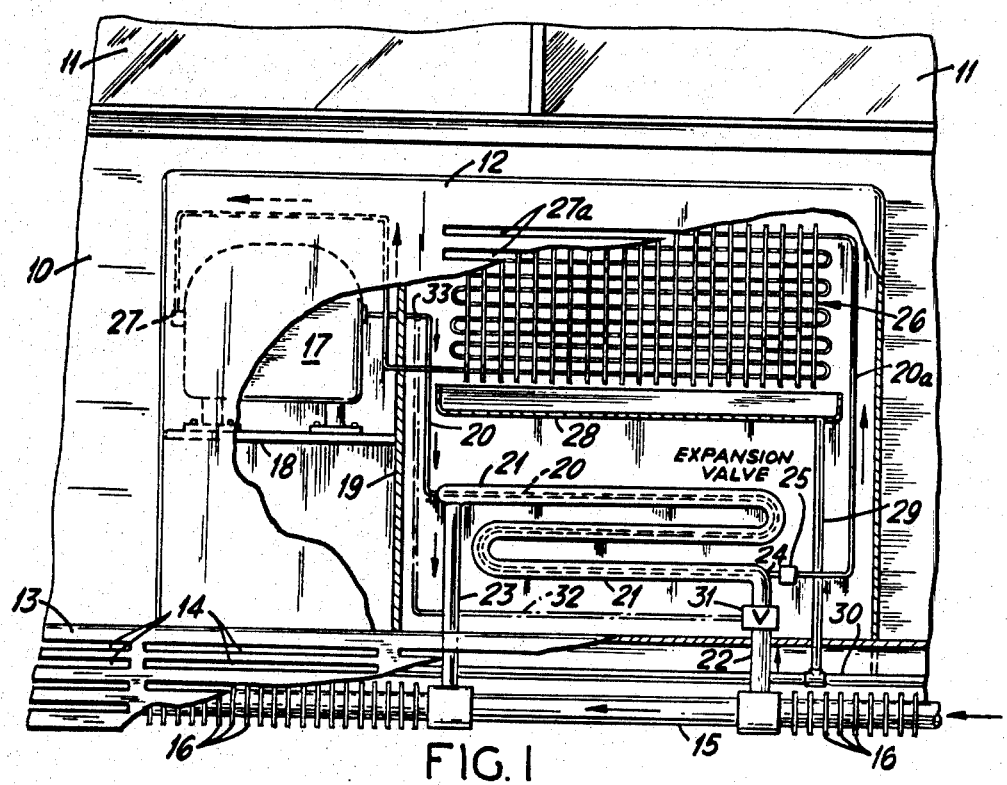

This application is a continuation-in-part of our copending application Ser. No. 454,604 filed May 10, 1965 (now abandoned).

It is known to provide residential or office buildings with central heating or cooling plants from which hot or cold water is circulated through a series of heating or air-conditioning units in different rooms. During the summer months, the water is used to cool a refrigerant such as Freon which flows in a closed circuit within each air-conditioning unit. During the winter months the water serves directly as a source of heat for each room.

The object of our present invention is to provide improved means for utilizing a circulating water flow as a temperature-controlling medium in a building having this type of central heating and cooling system.

A more particular object of our invention is to provide a temperature-control device for the purpose described which can be conveniently installed in a room equipped with a conventional baseboard heater.

These objects are realized, pursuant to our present invention, by the provision of branch conduits through which a minor fraction of the water traversing the main pipe can be diverted to a cooling unit bridged across a section of that pipe, the flow ratio between the main pipe and the branch conduits being so chosen that the major part of the flow, passing through the bridged pipe section, sufficiently moderates the temperature of the diverted water rejoining that flow to keep the overall flow cool enough for the operation of another air-conditioning unit in the next room. We have found that, as a useful rule of thumb, the proportion of water deviated at any unit should be approximately equal to 1/$n$ where $n$ is the number of units cascaded along the pipe; in most practical situations, this number will range between 3 and 12 so that the diversion ratio should fall between the limits of approximately 8% and 33%.

According to a more specific feature of our invention, the same mode of diversion can be used in directing a portion of the water flow, during the heating season, through respective radiators connected in parallel with the associated air-conditioning units across corresponding sections of the main pipe. If that pipe runs behind a baseboard, the heating and cooling units may be advantageously disposed at different levels above the baseboard, with the heating unit below the air-conditioning unit since the hot air tends to rise whereas the cool air gravitates toward the bottom.

A particular advantage of our invention is the fact that the cooling of the refrigerant in the air-conditioning units may be performed with water of moderately elevated temperatures so that, if desired, certain rooms can be cooled while others may be heated.

The above and other features of our invention will be described more fully hereinafter, reference being made to the accompanying drawing in which:

FIG. 1 is an elevational view (parts broken away) of a cooling unit branched across a section of water pipe in accordance with this invention; and FIG. 2 is a diagrammatic layout of an overall system having a series of air-conditioning units as shown in FIG. 1 connected in cascade, a separate heating unit being individually associated with each air-conditioning unit.

Reference will first be made to FIG. 1 which shows a baseboard heater and an associated air-conditioning unit of the type disclosed in our above-identified prior application. The baseboard heater comprises a pipe section 15 inserted between other sections of the same pipe provided with external fins 16; the pipe is concealed behind a baseboard 13 formed with vents 14. Branched across pipe section 15 by means of three-way junctions 44, 45 (FIG. 2) are a pair of conduits 22, 23 leading to an outer tube 21 of a heat exchanger 41 whose inner tube 20 serves for the circulation of a cooling fluid (Freon). The coolant leaves the tube 20 at 24 and passes through an expansion valve 25 into a section 20a of copper tubing which forms the inlet of an evaporator 26; vents 27a in the housing 12 of the unit serve for the circulation of air from a room to be cooled, this room having a wall 10 with windows 11. Evaporator 26, in which the cooling fluid is vaporized by the warm ambient air, discharges at 27 into a compressor 17 mounted on a shelf 18 within housing 12, the compressor compartment being separated from the evaporator compartment by a partition 19. The densified and, therefore, overheated vapors from condenser 17 return to the tube 20 of heat exchanger 41 where they give off their excess heat to the water in tube 21 and are condensed before again traversing the expansion valve 25.

The amount of water diverted into condenser tube 21 is determined by a valve 31 controlled in its turn by a thermostat 33 via a line 32; the thermostat comprises a bulb sensing the gas temperature at the discharge port of compressor 17. Even with maximum opening of valve 31, the rate of flow diverted from pipe 15 via conduit 22, 23 is a minor fraction (i.e. less than half) of the overall water flow. This rate, limited by the effective cross-section of circuit 21–23 (e.g. at valve 31), should be not greater than about one-third of two other units of like construction follow the unit of FIG. 1 in the manner illustrated in FIG. 2; with a diversion rate of 8 to 10%, as many as 10 or 12 units may be so cascaded. It should be noted that the aforestated rule of thumb applies, strictly speaking, only to the number of units connected downstream of the unit considered so that the last unit in the series could, if desired, receive the entire flow of circulating water; for standardization purposes, however, it will be convenient to dimension all units alike so that in each case only a minor fraction of water will be diverted.

To facilitate the operation of the evaporator 26, an air blower 42 (shown diagrammatically in FIG. 2) may be positioned alongside the evaporator. A drip pan 28 is connected via a drain 29 to an effluent tube 30.

As further illustrated in FIG. 2, the device shown in FIG. 1 may be expanded to include a heating unit 38, such as a radiator coil, connected between intermediate points of risers 22 and 23, thus lying at a level below condenser 41. A three-way valve 43 can be manually set to let the water circulate either through the radiator 38 or through the heat exchanger 41, depending on whether heating or cooling is desired.

FIG. 2, in which the elements of FIG. 1 together with heater 38 have been designated 50, also show an identical second device 50' which is branched across a pipe section 15' at a location downstream of unit 50; the elements of unit 50' have been given the same reference numerals as those of device 50 but with the addition of prime marks. Devices 50 and 50' are, of course, representative of any number of such devices connected in cascade. Pipe sections 15 and 15' are part of a common duct 51 having two branches 51a, 51b respectively containing a cooling tower 36 and a boiler 37; another three-way valve 39 determines which of these branches is to be connected in the circuit. A check valve 40 in branch 51a prevents the return of hot water from boiler 37 to cooling tower 36.

In cool-weather operation of the system shown in FIG. 2, water may enter the heating unit 38 from conduit 22 at a temperature of, say, 50° C. and leave it by conduit 23 at about 45° C. Conversely, the water entering condenser 41 from conduit 22 during hot-weather operation may have a temperature up to about 50° C., leaving the condenser with a temperature higher by another 5° or so, provided of course that a sufficiently high-boiling refrigerant is being used. Thus, the caloric content of the circulating water may be sufficient for an effective heating of some rooms while the air-conditioning units of other rooms are in operation. To prevent unwanted room heating under these circumstances, the fins 16 of FIG. 1 may be omitted in a system having separate bypass heaters 38.

Modification of structural details described and illustrated are, of course, possible without departing from the spirit and scope of our invention as defined in the appended claims.

We claim:

1. A system for controlling the temperature of a plurality of rooms in a building equipped with central heating and cooling means, comprising a pipe having feed means for the circulation of water therethrough, said pipe being alternately connectable across said central heating and cooling means for selectively heating or cooling the circulating water to a predetermined initial temperature, said pipe successively traversing a plurality of rooms whose temperature is to be controlled; heat-radiating means and a water-cooled air-conditioning unit in each of said rooms; branch conduit means in each of said rooms connecting each air-conditioning unit across a respective section of said pipe, said conduit means being substantially narrower than said section whereby a minor fraction of the water flowing through said pipe is diverted through said air-conditioning unit, the sections being connected in series along said pipe whereby said pipe constitutes the sole fluid circulating member of the system traversing said rooms, the air-conditioning units being connected in parallel with the respective sections; and valve means in said conduit means operable to pass the flow of diverted water through the associated air-conditioning unit.

2. A system as defined in claim 1 wherein the water-conducting capacity of said conduit means of at least the first cooling unit is substantially equal to $1/n$ that of said section, $n$ being the number of rooms provided with said cooling units.

3. A system as defined in claim 2 wherein $n$ ranges between 3 and 12.

4. A system as defined in claim 1 wherein said heat-radiating means comprises a heating unit connected to said conduit means, said valve means being operable for alternately directing said flow of diverted water to either of sad units.

5. A system as defined in claim 4 wherein said rooms are provided with baseboards concealing said pipe, said heating and air-conditioning units being disposed at different levels above said baseboards.

6. A system as defined in claim 5 wherein said air-conditioning unit is disposed above said heating unit.

References Cited

UNITED STATES PATENTS

| | | | |
|---|---|---|---|
| 2,715,515 | 8/1955 | Stair | 165—22 |
| 3,305,001 | 2/1967 | Haufler et al. | 165—22 |

FOREIGN PATENTS

| | | |
|---|---|---|
| 483,696 | 6/1952 | Canada. |

MEYER PERLIN, Primary Eraminer

CHARLES SUKALO, Assistant Eraminer

U.S. Cl. X.R.

165—50